United States Patent [19]
Oman

[11] Patent Number: 5,337,729
[45] Date of Patent: Aug. 16, 1994

[54] PORTABLE HEATER FOR VEHICLE ENGINES

[76] Inventor: Ronald Oman, P.O. Box 671281, Chugiak, Ak. 99567

[21] Appl. No.: 978,431

[22] Filed: Nov. 18, 1992

[51] Int. Cl.⁵ ............................................. F24H 1/00
[52] U.S. Cl. ............................. 126/350 A; 237/12.3 C
[58] Field of Search ............... 237/12.3 C, 12.3 R; 126/350 A, 248, 208, 116 R, 116 A, 350 R, 351, 56; 123/142.5 R; 432/222

[56] References Cited

U.S. PATENT DOCUMENTS

| | | | |
|---|---|---|---|
| 642,287 | 1/1900 | Bernner | 34/97 |
| 761,451 | 5/1904 | Cuvelier | 432/222 X |
| 1,862,114 | 6/1932 | Gilly | 237/12.3 C |
| 3,055,145 | 9/1962 | Lindsay | 432/222 X |

*Primary Examiner*—Henry A. Bennet
*Attorney, Agent, or Firm*—Michael J. Tavella

[57] ABSTRACT

A portable heater for airplanes, other vehicles and equipment is disclosed. The device has a cylindrical housing that has three legs attached. The legs can be folded against the housing for storage, or extended downward for use. Heat is provided by a small camp type stove that is placed within the housing. The heat is channeled from the housing to the vehicle using a flexible duct that extends from the top of the housing. The duct and stove are designed to fit inside the housing for storage. This allows the device to be stored in small planes and cars without taking up much space. The device uses lightweight materials to produce a heater with a high BTU output per pound.

12 Claims, 7 Drawing Sheets

PORTABLE HEATER FOR VEHICLE ENGINES

This invention relates to engine preheaters and more particularly to portable engine preheaters typically used for warming airplane and other vehicle engines as well as stationary engines.

BACKGROUND OF THE INVENTION

In every cold climate region, people often keep airplanes and other vehicles, including diesel powered heavy equipment outdoors year round. Similarly, stationary engines such as those used in electrical generation are often kept exposed to the elements. In the winter, these engines become extremely difficult to start without some type of preheating. The heat is typically applied to warm the engine oil to thin it and to warm the fuel intake components so that vaporization of the fuel is more reliable. Many automobiles have electrical block heaters or pad heaters that heat the engine's coolant or oil pan. A block heater causes the warmed coolant to circulate within the engine, thereby warming the components and the oil. Heating the oil pan warms the oil, which thins it and makes it flow easily through the engine on startup. These heaters are seldom found on airplanes. Even if such heaters are installed on the airplane, when the airplane is parked at a remote airstrip, there may not be any electricity to operate the heater.

Instead of providing electrical outlets for electric engine heaters, some airports keep portable engine heaters. These heaters are usually a burner type heater using some type of liquid fuel such as gasoline or propane to warm air and blow it over an engine. Many models use electric fans to force the warmed air over the engine. Some even provide a small gasoline powered generator to power the fan.

Examples of heaters are found in U.S. Pat. Nos. 4,268,248 Wilbur et al., and 3,454,266 to Mattinkly. Both Patents show heaters used to warm airplane engines. The Mattinkly Patent uses a battery powered fan to blow warm air produced by a gas fired burner. The Wilbur Patent discloses a smaller, more portable, burner that uses disposable gas cylinders as a fuel source. This device uses a portion of the hot exhaust gas to warm the gas cylinder. It also uses a battery driven fan. Both devices are considered portable, but they weigh a considerable amount and take up considerable space in an airplane. Besides the weight and size problems, the devices that use batteries to operate the fan use power that could be used to crank the engine of the plane. In cold weather, batteries operate poorly and operating a fan to warm the engine may tax the battery to the point where it will not properly crank the engine. Carrying a second battery simply to operate the fan adds that much more weight to these devices. Additionally, as noted above, the Wilber Patent uses disposable gas cylinders. The empty cylinders will often be left at the remote sight, such as airstrips, lakes and campgrounds, which adds to the already serious waste problem. Another drawback in these designs is that these heaters operate using only one type of fuel. Finally, they are not readily adaptable, in an emergency, into a survival stove. They cannot readily be used to heat water, melt snow or cook a meal.

SUMMARY OF THE INVENTION

The present invention overcomes the problems identified with the engine preheaters described above. The invention has a cylindrical plenum that rests on a tripod base. The tripod legs are mounted to the base with shock cords that allow the legs to be stored in an upright position, and then extended for use. The extend tripod legs form a stable support for the heater. The upper portion of the plenum is fitted with a reducing fitting. A flexible duct, used to carry the warmed air to the engine, is attached to the reducer fitting using a standard hose clamp.

The source of heat for the unit is a small camp stove. The preferred stove has a fuel tank separated from the burner by a fuel tube, that allows the fuel tank to remain outside the plenum during operation. Ideally, the stove also should be able to burn a variety of fuels. A stove such as the Mountain Safety Research MSR model GK or XGK is preferred. The stove burner can be placed into the plenum through a small access door, while the fuel tank and operating controls are left outside. In this manner, the access door can be safely closed, thereby increasing the heat output of the device. To provide combustion air, several air intake holes are provided in the bottom of the plenum.

This heater can be packed as a unit for storage. Components, such as the duct, and stove, can be placed within the plenum. The reducer, with a cap, seals the top of the unit. The tripod legs can be folded against the sides of the plenum and the device can be placed into a small bag for storage.

Because this preheater operates on natural draft principles, relying on properly sized combustion air intake holes to enable maximum air flow, it dispenses with a fan and the need for electric power to operate the fan. Thus, this heater is ideal for use in remote areas where electricity is not always available.

It is an object of this invention to produce an engine preheater for airplanes, other vehicles, and stationary engines that is lightweight and self contained.

It is another object of this invention to produce an engine preheater that is small enough to be easily carried in a small aircraft, car or carried in a backpack.

It is yet another object of this invention to provide a lightweight portable engine preheater that can be operated on many types of fuel.

It is a further object of this invention to produce an engine preheater that is simple to operate and repair.

It is yet another object of this invention to produce an engine preheater that will operate consistently in extremely cold temperatures.

It is yet another object of this invention to produce an engine preheater that can be used as an emergency cooking survival stove.

It is a further object of this invention to produce an engine preheater that is easy to assemble and store without the use of tools.

It is another object of this invention to produce an engine preheater that makes minimum impact on the environment.

DETAILED DESCRIPTION OF THE PREFERRED EMBODIMENT

Figure 1:
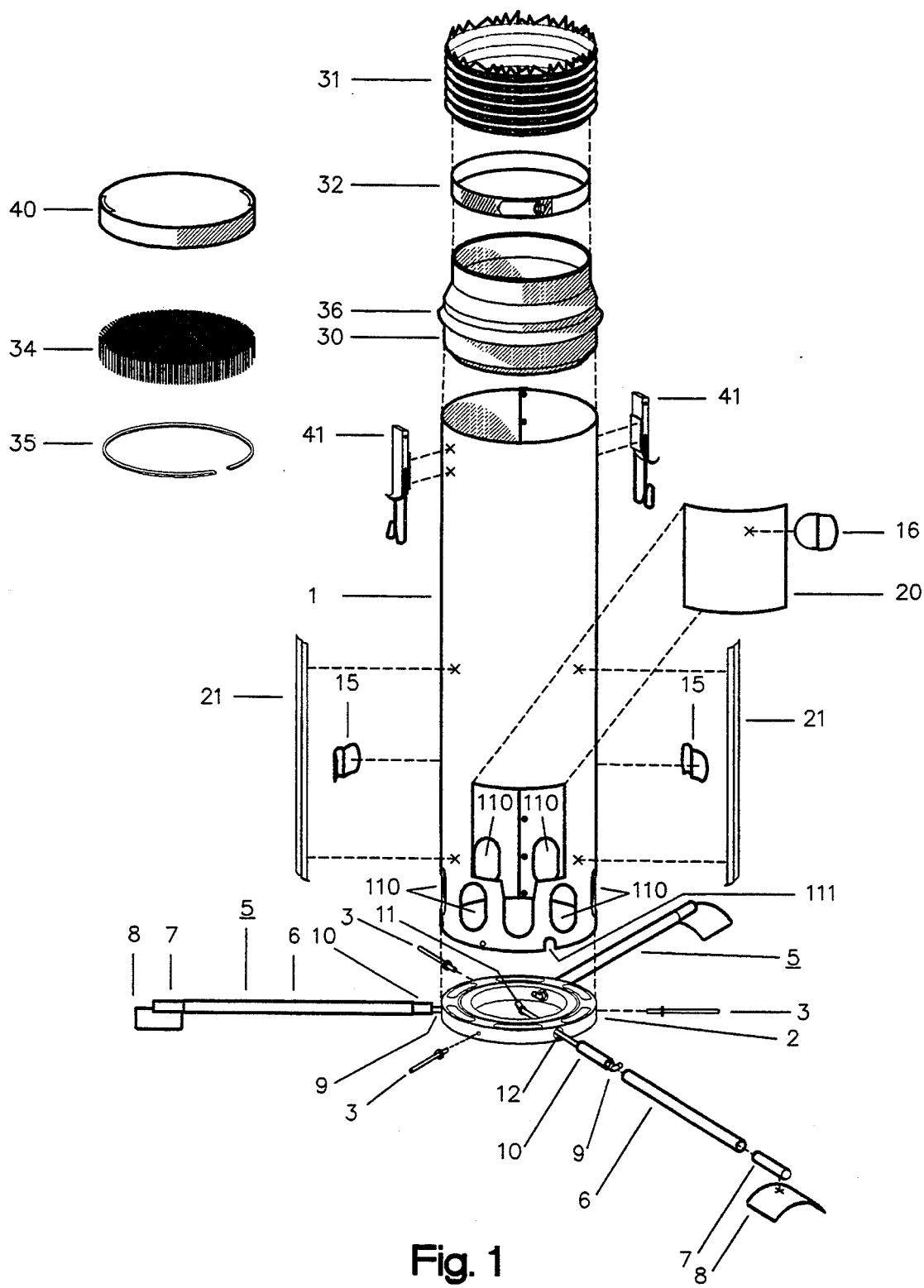
FIG. 1 is an exploded view of the invention without the stove heater in place.
Figure 2:
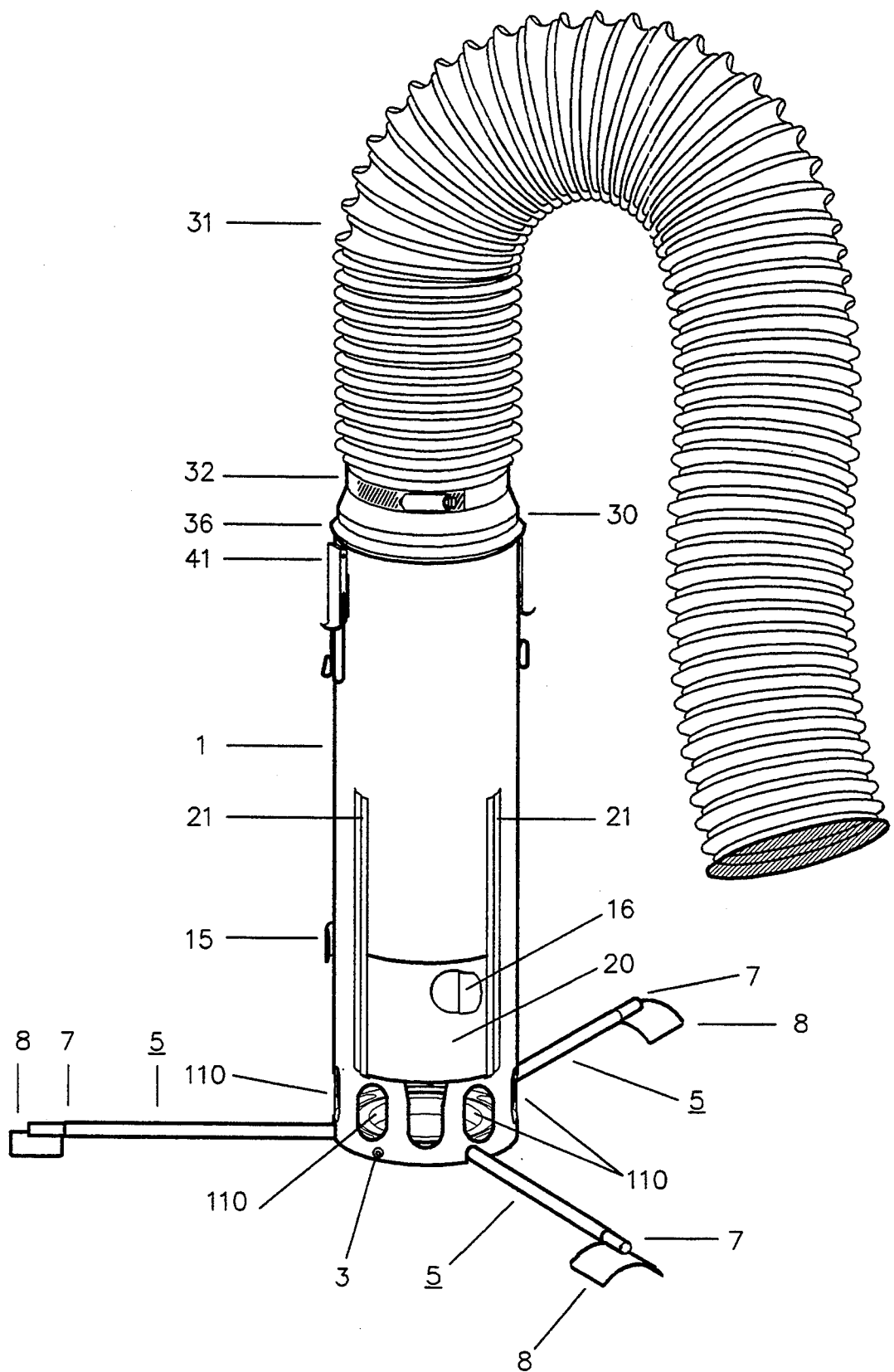
FIG. 2 is a perspective view of the invention without the stove heater in place.
Figure 3:
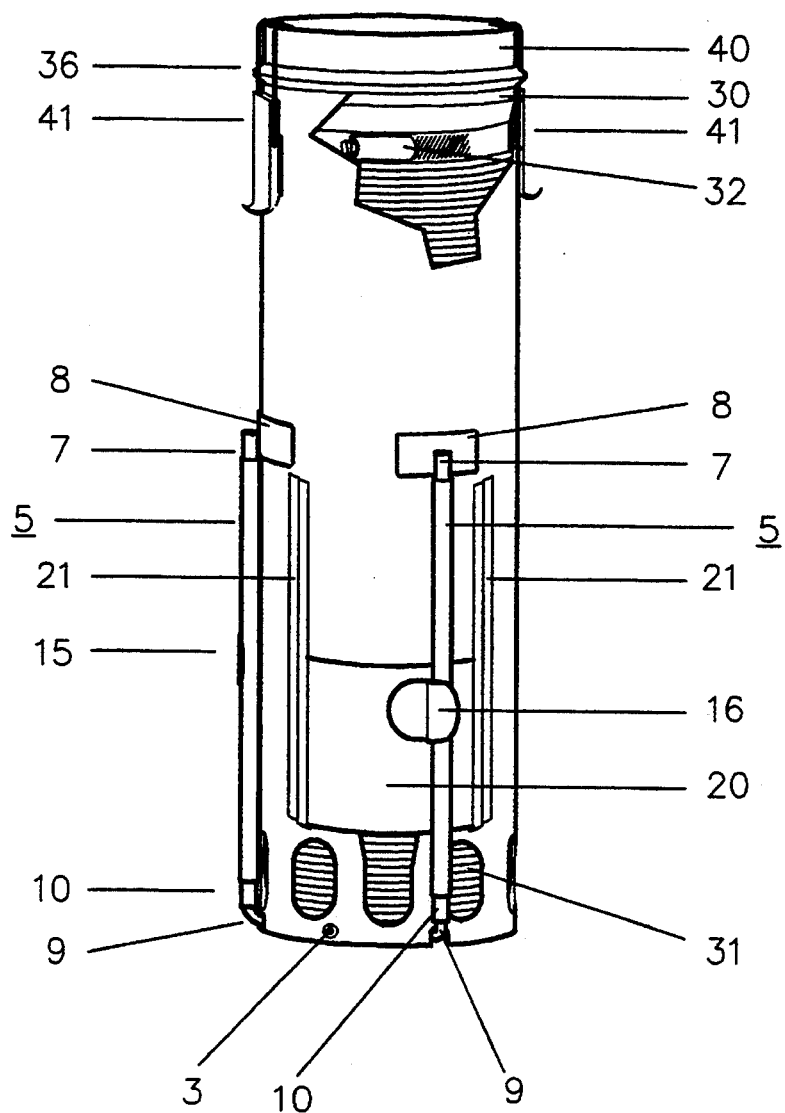
FIG. 3 is a perspective view of the invention as packed for storage.
Figure 7A:
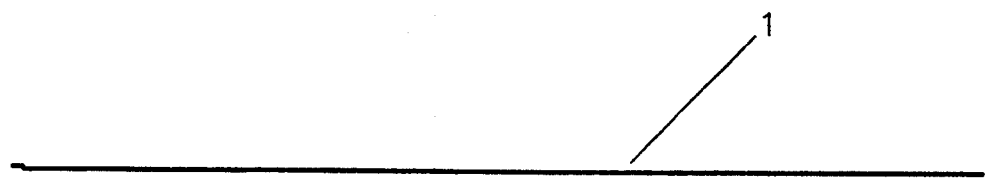
FIG. 7a is a top view of the stamping pattern used in the plenum construction.
Figure 7B:
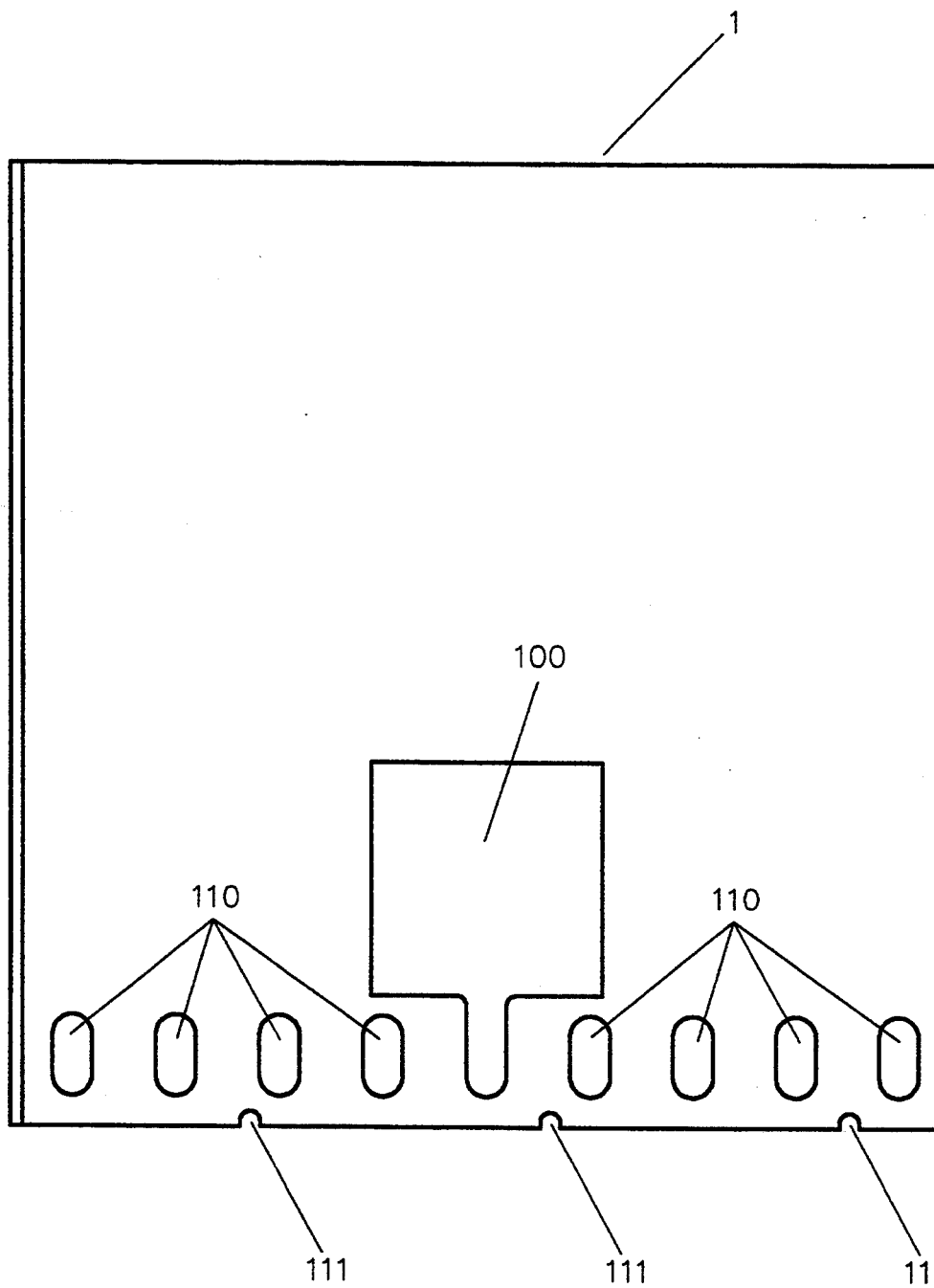
FIG. 7b is a side view of the stamping pattern used in the plenum construction.

Referring now to the drawings, and more particularly to FIGS. 1, 2 and 3, The device has a cylindrical plenum housing 1. In the preferred embodiment, the housing 1 is formed from a sheet of 22 gauge stainless steel. Other suitable metals can be substituted for the stainless steel. This metal provides a good balance between weight and strength. FIGS. 7a and 7b show the stamping pattern for the housing 1. This pattern shows the access door opening 100 and several combustion air intake holes 110 that are punched near the bottom of the sheet. In the preferred embodiment, the cylinder is 16 inches tall. The access hole 100 is approximately four inches square. Each air intake hole is approximately 1¼ inches in height and 0.875 inches wide. Of course, other dimensions can be used to form the various components shown. Note that the sheet has a ⅜ inch offset that provides a welding platform for the seam when the sheet is rolled into a cylinder. These dimensions provide a convenient size for the device and help to reduce the weight. Besides these features, three small holes 111 are provided to accommodate the legs that are attached to the base. See, e.g., FIGS. 1 and 2. The legs are described in more detail below.

Referring again to FIG. 1, a base 2 is attached to the bottom of the cylinder as shown. The base is formed or machined from a suitable metal and is designed to be lightweight. The base 2 is secured to the cylinder 1 using pop rivets 3 or other means common to the art, including nuts and bolts, or welding. The base 2 has an open, recessed center to permit the burner of the stove (see FIG. 8), to be placed in the center of base 2.

Three legs 5 are attached to the base 2 to provide additional support for the device. The legs 5 are formed of an outer hollow tube 6, an end plug 7, a curved base support 8 and a connecting tube 10. The legs 5 are connected to the device by shock cords 9. The shock cords 9 are passed through a connecting tube 10 and hollow tube 6. A knot is then tied and the shock cord is pulled back through hollow tube 6 so that the knot will fit against connecting tube 10 as shown. The untied end 11 of the shock cords 9 are passed through holes 12 in the base 2 and then tied as shown. This prevents the cord from being pulled completely from the base 2. FIG. 3 shows the legs in their folded position for storage. To store the legs 5, the leg 5 is pulled from the base 2, which extends the shock cord 9. Once the leg has cleared the wall of the housing 1, the leg 5 is turned parallel to the housing 1 and rotated so that the curved base support 8 follows the contour of the housing 1. Hollow tube 6 is then placed into leg clips 15 and 16, as appropriate, to secure each leg in place. Leg clips 15 are attached to the housing 1 to secure the legs as shown in FIG. 3. One leg clip, 16, also acts as a door handle, as discussed below.

An access door 20 is provided to allow the burner of the stove 50 to be placed within the housing. The door 20 is secured to the housing 1 with two slide channels 21 that are welded to the housing. The channels 21 are bent to permit the door to be placed within the channels 21 as shown. The door 20 can be slid up or down as access is needed. As noted above, one leg clip, 16, is attached to the access door 20 to be used as a door handle.

Although not shown in the drawings, the access door 20 also can be attached to the housing 1 with a hinge or hinges.

The top of the housing 1 is fitted with a reducer fitting 30. The reducer fitting 30 is used to attach a flexible duct 31. This flexible duct 31 is also expandable. See FIG. 2. Thus, the duct 31 can be bent and extended to supply warm air to the engine being warmed. See. e.g., FIG. 4. This duct 31 also can be compressed in length for storage, as discussed below.

The duct 31 is attached to the reducer 30 by a hose clamp 32. A spark arrester screen 34 is provided within the reducer 30. The screen 34 is held in place within the reducer 30 by a circular spring wire 35. Spring wire 35 seats in groove 36. To install the screen within the reducer, the spring wire 35 is compressed. Then the screen 34 is folded around the compressed spring wire 35. This assembly is then slipped into the large end of the reducer 30. The spring wire 35 remains compressed against the side wall of the reducer 30 until it reaches a flange 36. At that point, the spring wire 35 expands and the screen is then locked onto place. The reducer 30 is placed inside the top of the housing 1. The flange 36 is sized to contact the top edge of the housing 1 to keep the reducer from completely entering the housing 1. The reducer 30 is removable to allow the stove 50 and duct 31 to be stored inside the housing when the device is not in use. For storage, the reducer 30 is pulled from the housing 1 with the flexible duct 31 still attached. This assembly is inverted and the duct 31 can then be placed into the housing 1 until the inverted reducer cap 30 engages the housing 1.

A removable cap 40 is also provided for when the device is packed for storage. See discussion below and FIG. 3. The cap 40 is secured to the housing 1 using latches 41. Other suitable latching means also can be used to secure the cap 40 to the housing 1 as well.

As discussed above, the device can be packed for storage. Referring to FIG. 3, to store the unit, the duct 31 and the hose clamp 32 are placed inside the housing. The duct 31 is compressed down to fit within the housing. The stove 50 is disassembled and then placed within the duct 31. The legs 5 are folded and stored in the clips 15 and 16 as shown. The cap 40 is then placed on top and secured with latches 41.

Figure 8:
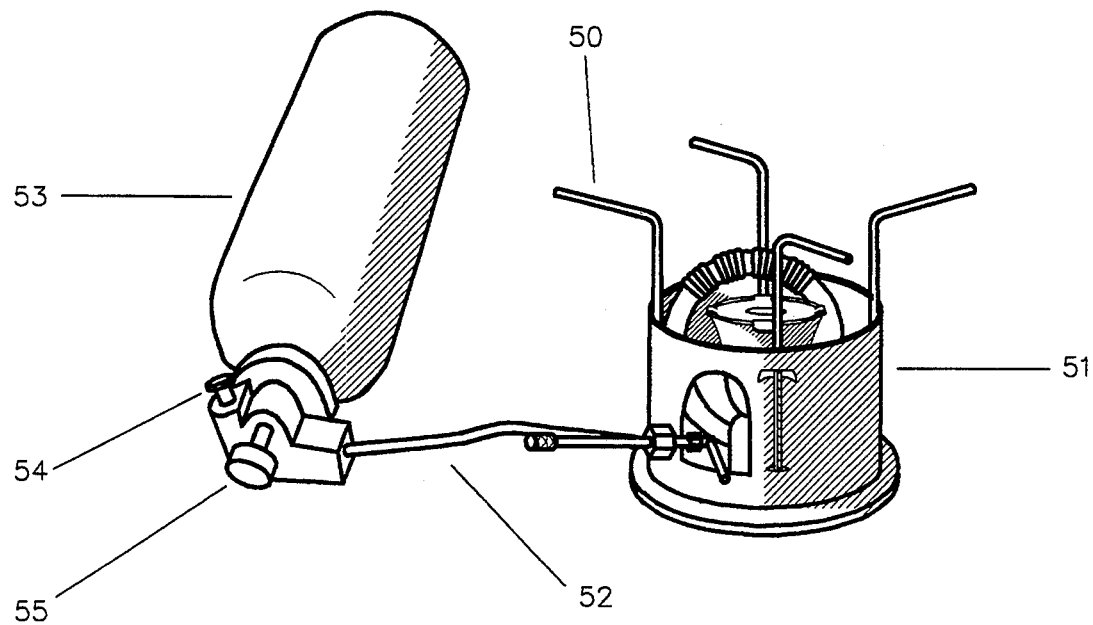
FIG. 8 is a detail of the MSR type XGK stove.

Referring now to FIG. 8 stove 50 is a backpacking type stove. In the preferred embodiment, the stoves manufactured by MOUNTAIN SAFETY RESEARCH known as MSR stoves are used. There are two preferred models: the MSR GK or the MSR XGK, these stoves have a burner unit 51 that is fed by a fuel tube 52. The fuel tube 52 is supplied by a fuel bottle 53. The burner controls 54 for the MSR stoves are placed at the top of the fuel bottle 53. A pump 55 for the fuel bottle is attached to the fuel bottle 53 as shown. The use of this type of stove has two advantages. First, the burner unit 51 can be completely placed within the housing 1 while the fuel tank and controls remain outside the housing 1. This allows the stove to be controlled during the heating operation while the access door remains closed, thereby keeping the heating operation highly efficient. Further, the fuel tank 53 is kept safely away from the heat and flame, thereby reducing the chance of explosion and increasing the safe operation of the device. This type of stove also has the advantage of producing high BTU output in a lightweight prepackaged design. Finally, the MSR type stoves are designed to be multi-fuel capable. Thus, any fuel, including the AV gas on the airplane can be used to fuel the stove. The MSR type stoves are disassembled by pulling fuel tube 52 out of pump assembly 55.

Figure 4:
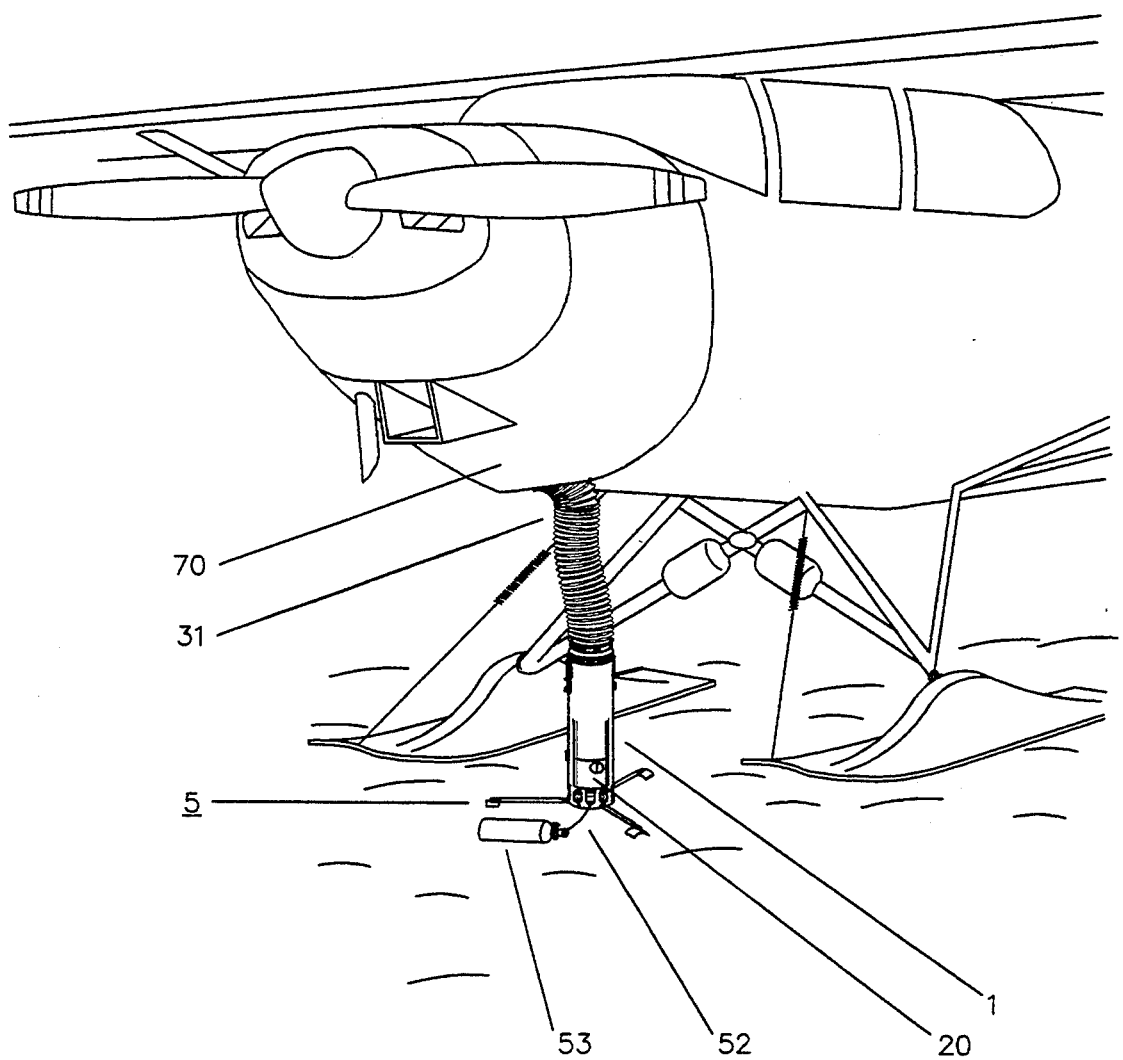
FIG. 4 is a perspective view of the invention in use, warming an airplane with the stove heating element in place.
Figure 5:
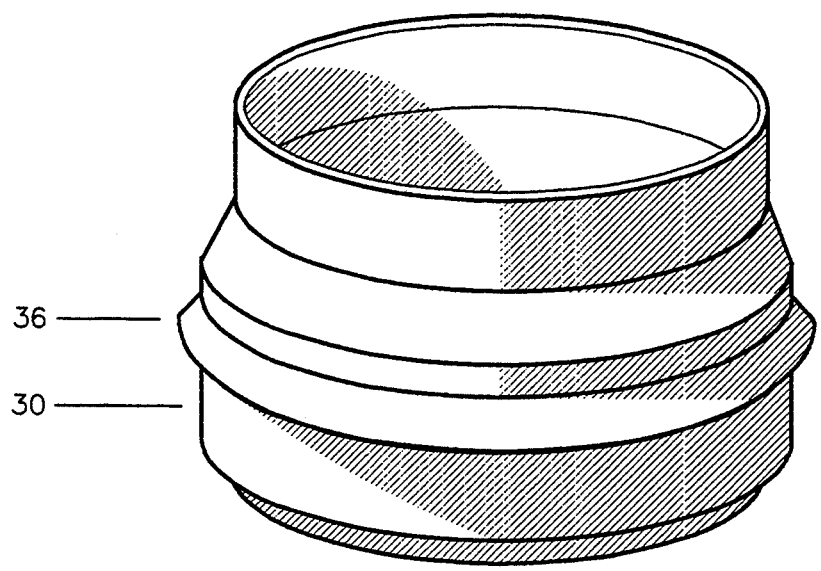
FIG. 5 is a detail view of the reducer.
Figure 6:
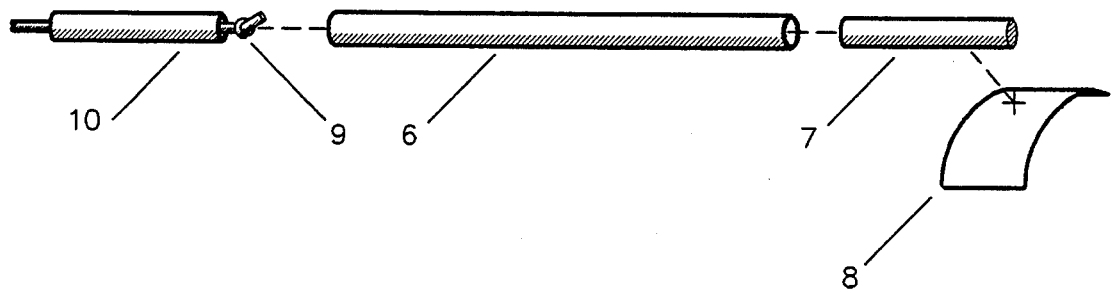
FIG. 6 is a detail of the internal construction of a typical tripod leg.

FIG. 4 shows the device warming an airplane engine. The legs 5, when extended, provide a sturdy base for the device on any type of terrain that can support an airplane. In use, the legs 5 are first extended. The cap 40 is then removed and the flexible duct assembly and stove are removed from the housing 1. The free end of the flexible duct 31 is inserted into the engine cowl 70 on the opposite side of the gascolator prior to inserting the stove into the housing. The reducer 30, with the flexible duct 31 attached, is then inserted into the housing 1. The stove 50 is assembled and the burner unit is lit a few feet from the airplane. After tile initial flareup of the stove has subsided, the burner 51 is placed inside the housing through access door 20. The access door 20 is then closed. The stove 50 is shown in place at the bottom of the housing 1.

The present disclosure should not be construed in any limited sense other than limited by the scope of the claims having regard to the teachings herein and the prior art being apparent with the preferred form of the invention disclosed herein that reveals details of structure of a preferred form necessary for a better understanding of the invention and may be subject to change by skilled persons within the scope of the invention without departing from the concept thereof.

I claim:

1. A portable heater for airplanes and other vehicles, comprising:
   a) a housing being substantially cylindrical and having an outer wall, an open interior, a top and a bottom;
   b) a plurality of legs, extendably attached to said housing;
   c) access means within said housing wall to permit access into said open interior of said housing;
   d) a burner unit having heating means, said burner unit being removably, and completely, placed within said housing through said access means for use;
   e) control means to control said heating means; and
   f) duct means removably attached to said housing to direct heat produced by said heating means to a desired location.

2. The portable heater of claim 1 wherein said outer wall has at least one hole therethrough to provide combustion air for said heating means.

3. The portable heater of claim 1 wherein said heating means and duct means may be stored within said housing when portable heater is not in use.

4. The portable heater of claim 1 wherein said heating means is portable.

5. The portable heather of claim 1 wherein said heating means is liquid fueled.

6. The portable heater of claim 5 wherein said heating means is a camping type stove.

7. A portable heater for airplanes, other vehicles and equipment, comprising:
   a) a housing being substantially cylindrical and having an outer wall, an open interior, a top and a bottom, said outer wall having at least one hole therethrough to provide combustion air for said heating means, said outer wall also having an access hole within said outer wall to permit access into said open interior of said housing;
   b) a plurality of legs, extendably attached to said housing;
   c) a door, attached to said outer wall to cover said access hole;
   d) a portable heat means removably placed within said housing through said access means;
   e) control means to control said heating means; and
   f) a flexible, duct, removably attached to the top of said housing to direct heat produced by said heating means to a desired location.

8. The portable heater of claim 7 wherein said heating means and flexible duct may be stored within said housing when the portable heater is not in use.

9. The portable heater of claim 7 wherein said heating means is portable.

10. The portable heater of claim 7 wherein said door is slidably attached to said housing.

11. The portable heater of claim 7 wherein said heating means is liquid fueled.

12. The portable heater of claim 11 wherein said heating means is a camping type stove.

* * * * *